United States Patent [19]

Gutleber

[11] 4,293,953
[45] Oct. 6, 1981

[54] BI-ORTHOGONAL PCM COMMUNICATIONS SYSTEM EMPLOYING MULTIPLEXED NOISE CODES

[75] Inventor: Frank S. Gutleber, Little Silver, N.J.

[73] Assignee: The United States of America as represented by the Secretary of the Army, Washington, D.C.

[21] Appl. No.: 108,195

[22] Filed: Dec. 28, 1979

[51] Int. Cl.³ .................. H03K 13/01; H04J 1/04
[52] U.S. Cl. ........................ 375/25; 375/96; 340/348; 340/350; 370/18; 370/21
[58] Field of Search ............... 370/18, 19, 20, 21, 370/22, 77, 78, 79; 340/348, 345, 346, 349; 375/38, 39, 103, 100, 25, 96, 92; 364/572

[56] References Cited

U.S. PATENT DOCUMENTS

| | | | |
|---|---|---|---|
| 3,461,451 | 8/1969 | Gutleber | 340/348 |
| 3,483,549 | 12/1969 | Gutleber | 375/25 |
| 3,484,554 | 12/1969 | Gutleber | 370/18 |
| 3,510,595 | 5/1970 | Gutleber | 340/348 |
| 3,519,746 | 7/1970 | Gutleber | 370/18 |
| 3,634,765 | 1/1972 | Gutleber | 375/96 |
| 3,947,674 | 3/1976 | Gutleber | 340/348 |
| 4,019,149 | 4/1977 | Kustka | 375/96 |
| 4,032,885 | 6/1977 | Roth | 375/96 |

*Primary Examiner*—Benedict V. Safourek
*Assistant Examiner*—Stephen Chin
*Attorney, Agent, or Firm*—Nathan Edelberg; Jeremiah G. Murray; Edward Goldberg

[57] ABSTRACT

A bi-orthogonal PCM communications system employing multiplexed noise codes to provide enhanced protection against interference. Two system approaches are described—a first of which employs active, matched filter detection, whereas a second of which employs passive matched filter detection. The noise codes employed are of a type termed code mates having correlation functions which, upon detection, provide an impulse autocorrelation function. The described arrangements afford a transmission efficiency which extends towards Shannon's theoretical limit.

9 Claims, 5 Drawing Figures

BI-ORTHOGONAL PCM COMMUNICATIONS SYSTEM EMPLOYING MULTIPLEXED NOISE CODES

The invention described herein may be manufactured and used by or for the Government for governmental purposes without the payment of any royalties thereon or therefor.

FIELD OF THE INVENTION

This invention relates to pulse code modulation communications systems and, more particularly, to such a system where transmission efficiency, self-interference or jamming is of great concern.

BACKGROUND OF THE INVENTION

As is well known and understood, basically all communications systems are evolving toward a predominantly digital structure, being binary in operation, and with delta modulation or pulse code modulation. As is also well known, associated with each of these available systems is a bit error rate which limits the extent to which the communication system extends to reach Shannon's performance limit. This characteristics is of extreme importance in communication systems which must operate in over-crowded frequency bands where self-interference often results, or in a hostile jamming environment.

SUMMARY OF THE INVENTION

As will become clear hereinafter, the pulse code modulation (PCM) communications system of the present invention is a bi-orthogonal PCM system employing perfect, multiplexed noise codes to provide protection against jamming, while simultaneously providing signal enhancement. As is described in my issued U.S. Pat. Nos. 3,461,451, 3,519,746, and 3,634,765, for example, these noise codes have amplitude and autocorrelation functions which provide a peak output at a given time and a zero output at all other times. As is there noted, when the code mates are detected and the resultant detected outputs are linearly added, there is provided an impulse output of high amplitude at one given time and a zero output at all other times.

Two specific embodiments are described to illustrate the principles of the invention. In one of them, an active, coherent system is described, which employs time permutations for an active, matched filter detector configuration. In a second embodiment, a tapped delay line arrangement is utilized in a passive, matched filter detector construction. With either arrangement, an increase in transmission efficiency results—and represents an improvement over conventional bi-orthogonal PCM communication systems without the use of noise codes, where frequency restrictions or time restrictions do not substantially impair the ability of a hostile party from sending jamming signals in a frequency or time slot in which information signals are being transmitted.

As will be seen below, the use of the perfect noise codes provides an overall improvement to the communications system against such intentional interference by a factor of N, where N represents the number of bits in the noise code.

BRIEF DESCRIPTION OF THE DRAWING

These and other features of the present invention will be more readily understood from a consideration of the following description taken in connection with the accompanying drawings in which.

DETAILED DESCRIPTION OF THE DRAWINGS

Figure 1:
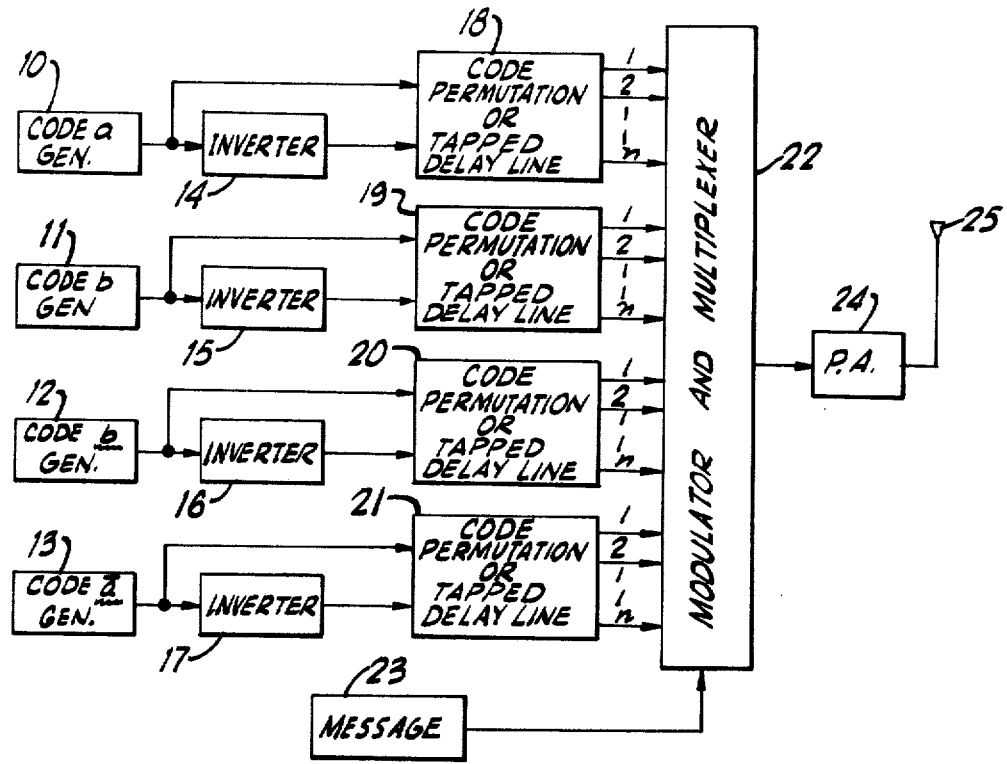
FIG. 1 is a functional block diagram of a generalized transmitting portion of a bi-orthogonal PCM communications system employing multiplexed noise coding.

Before considering the detailed constructions of the drawings which follow, it would be appropriate to first consider a bi-orthogonal PCM communications system in which multiplexed noise codes are utilized. In such a system, the information codes serve as the time permutations for a system employing an active matched filter detector (i.e., a construction in which a multiplication function is followed by an integration function) or the time slot positions for a system employing a passive matched filter detector (i.e., one of pulse compression). As will be appreciated by one skilled in the art, because there exist "n" total permutations or "n" time positions in a noise code containing "n" bits, then "n" totally non-interfering codes or code positions will exist. Using the negative, or complementary, codes (as in a bit-orthogonal system) will be noted to double the quantity of available information codes, or to provide "2n" quantized levels. In a system operating with multiplexed noise codes, furthermore, "n" orthogonal codes with zero cross-correlation may also be realized. Although only "n/2" permutations or time slot positions exist due to the aspect of multiplexing, the quantity is doubled due to the existence of a second mate pair set that is completely orthogonal to the first mate pair set.

In accordance with the bi-orthogonal concept of the invention, for a code mate pair "a" and "b", an orthogonal mate code pair can be obtained by transposing these codes, inverting them, and forming the negative complements of one of the codes of the new pair. Definitions of "transposing", "inverting" and "taking the negative" are as follows:

negative: a code x becomes a code $\overline{x}$, where binary "1" becomes binary "0" and vice versa, e.g. 1011 becomes 0100.

inverting: a code x becomes a code $\underline{x}$ where the order of the binary bits are reversed, e.g. 1011 becomes 1101.

transposing: a code transmitted on a first channel becomes the code on a second channel and vice versa, e.g. $\begin{matrix} x_1 & x_2 \\ \text{to} \\ x_2 & x_1 \end{matrix}$ Expressed mathematically:
For a code set $$a$$
$$b$$

form a new set $$\underset{\sim}{b}$$
$$\underset{\sim}{\bar{a}}$$

According to the invention, a code set a and b is then converted to a new set $\underset{\sim}{b}$ and $\underset{\sim}{a}$. In one channel, the code a or $\underset{\sim}{b}$ is transmitted, while on the second channel, the appropriate mate code b or $\underset{\sim}{\bar{a}}$ is transmitted.

As is noted in my aforementioned United States patents, a number of classes of codes (i.e. pairs of code signals termed code mates) exist to comprise an impulse autocorrelation function in that they compress to a single impulse containing no lobes. Such noise codes are characterized by having an autocorrelation function of equal magnitude and opposite sense for all instances of time outside of the main lobe, such that the simple linear sum of their orthogonally multiplexed matched filter outputs results in compressing the composite code into a single impulse. One such mate code pair set which meets this autocorrelation requirement, and as utilized in the systems of the present invention, are four bit multiplexed codes set forth as follows:

Code (a) = 1000
Code (b) = 0010
Where:
  0 indicates a plus (+)
  1 indicates a minus (−).

In accordance with the teachings of the present invention, the new code mate pair so formed under the transposed process is totally non-interfering with the original code mate pair. This can be illustrated by demonstrating that the cross correlation function between the two code sets $$a \quad \underset{\sim}{b}$$
and
$$b \quad \underset{\sim}{\bar{a}}$$

is zero. The cross correlation function $\tau$ is given by:

$$\phi_T = a^*\underset{\sim}{b} + b^*\underset{\sim}{\bar{a}}$$

But since $$a^*\underset{\sim}{b} = b^*\underset{\sim}{a}$$

and $$a^*\bar{b} = -a^*b$$

$$\phi_T = a^*\underset{\sim}{b} - a^*\underset{\sim}{b} = 0$$

where x*y = crosscorrelation function between x and y.

The following code sets (including the negative or complementary codes) in conjunction with their code permutations or time slot positions provides a total of $4 \times n/2 = 2n$ bi-orthogonal codes.

| | | | | |
|---|---|---|---|---|
| Channel 1 | a | $\bar{a}$ | $\underset{\sim}{b}$ | $\underset{\sim}{\bar{b}}$ |
| Channel 2 | b | $\bar{b}$ | $\underset{\sim}{\bar{a}}$ | $\underset{\sim}{a}$ |

For the four bit multiplexed perfect noise codes noted above, this would then generate into the following 16 bi-orthogonal code pairs, where the original code "a" or "b" is successively permutated 1 bit count.

| Channel 1 | a | $\bar{a}$ | $\underset{\sim}{b}$ | $\underset{\sim}{\bar{b}}$ |
|---|---|---|---|---|
| | 1000 | 0111 | 0100 | 1011 |
| | 0100 | 1011 | 0010 | 1101 |
| | 0010 | 1101 | 0001 | 1110 |
| | 0001 | 1110 | 1000 | 0111 |

| Channel 2 | b | $\bar{b}$ | $\underset{\sim}{\bar{a}}$ | $\underset{\sim}{a}$ |
|---|---|---|---|---|
| | 0010 | 1101 | 1110 | 0001 |
| | 0001 | 1110 | 0111 | 1000 |
| | 1000 | 0111 | 1011 | 0100 |
| | 0100 | 1011 | 1101 | 0010 |

Referring, now, to the transmission portion of FIG. 1, four code generators 10–13 are illustrated, to respectively generate the codes "a", "b", "$\underset{\sim}{b}$" and "$\underset{\sim}{\bar{a}}$". The outputs of these generators are, in turn, applied to inverter stages 14–17 and, also, to one input of a "code permutation or tapped delay line" units 18–21, the time permutation sections of which are utilized in an active coherent system, whereas the delay line sections are employed in a passive coherent system. As indicated, coupled to a second input of these units 18–21 is the output of the respective inverter stage.

Four output signals, delayed one time position with respect to each other are provided from each of the units 18–21 as an input signal applied to a modulator and multiplexing stage 22, to another input of which is supplied the message information to be modulated, as from a message source 23. The multiplexed output is then applied, by way of a power amplifier 24, to an antenna system 25 for transmission. Although four outputs are provided from the units 18–21 to the stage 22, in general "n" outputs would be provided from each of the units 18–21, depending upon the number of bits in the noise code (here, assumed to be 4). In this manner, the two orthogonal code pairs are generated, and then either permutated or time delayed "n/2" times along with their inverted (negative) codes. An active coherent system would employ permutations, whereas a passive coherent system would involve time delays. The code pair representing the appropriate quantized level would then be digitally selected by the modulating message signal, and orthogonally multiplexed into two channels for transmission.

Figure 2:
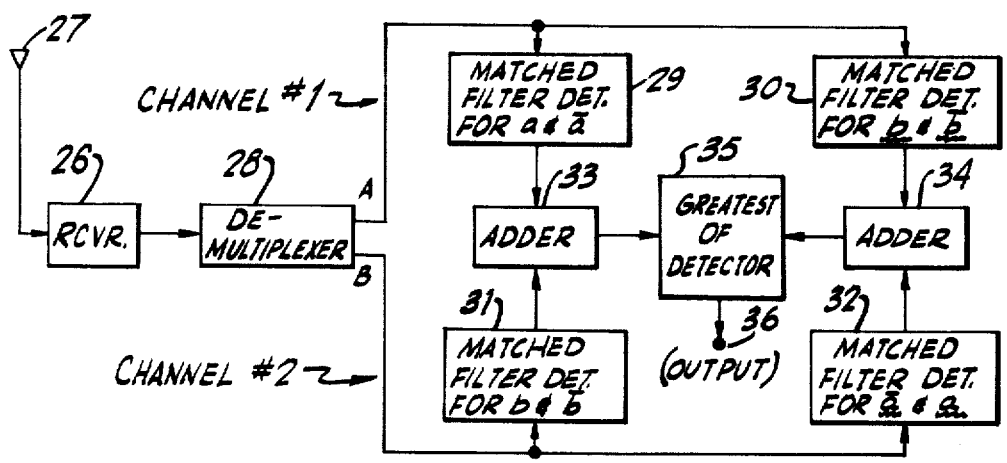
FIG. 2 is a functional block diagram of a generalized receiving portion of such a communication system for use with the multiplexed coding of the invention.

In the functional block diagram of FIG. 2, a detection function is employed which involves a "maximum likelihood process". A receiver stage 26 is shown as coupling the antenna system 27 to a de-multiplexer stage 28, on output of which A provides the Channel #1 codes while a second output B provides the Channel #2 codes. Four matched filter detectors 29–32 are shown, with the detector 29 being coupled to respond to the codes "a" and "$\bar{a}$" present in the Channel #1 output. Similarly, the detector 30 is coupled to respond to the codes "b" and "$\bar{b}$" present in the Channel #1 output, while the detector 31 is coupled to respond to the codes "b" and "b̄" present in the Channel #2 output, and the detector 32 coupled to respond to the codes "ā" and "a" also present in the Channel #2 output. A pair of adders 33, 34 are included, the first being responsive to the outputs from the detectors 29 and 31, and the second being responsive to the outputs from the detectors 30 and 32. These adders then provide input signals to a "greatest-of-detector" 35, of appropriate construction, to provide the transmitted code pair at its output terminal 36.

With the "maximum likelihood process" of the FIG. 2 block diagram, all the possible code pairs become detected in a matched filter and the "most likely" (i.e., the output whose amplitude is the greatest) is selected in a "greatest-of" detector 35. This first involves de-multiplexing the Channel #1 codes (a and b) and their negatives (ā and b̄) from the Channel #2 codes (b and ā) and their negatives (b̄ and ā). The codes "a" and "b" are then linearly added after being detected in the matched filter and applied to the "greatest-of" detector. Simultaneously, the codes "b" and "ā" are linearly added after being detected in the matched filter and applied to the same "greatest-of" detector. The code pair which yields the largest output is then selected as identifying the transmitted code pair.

Figure 3:
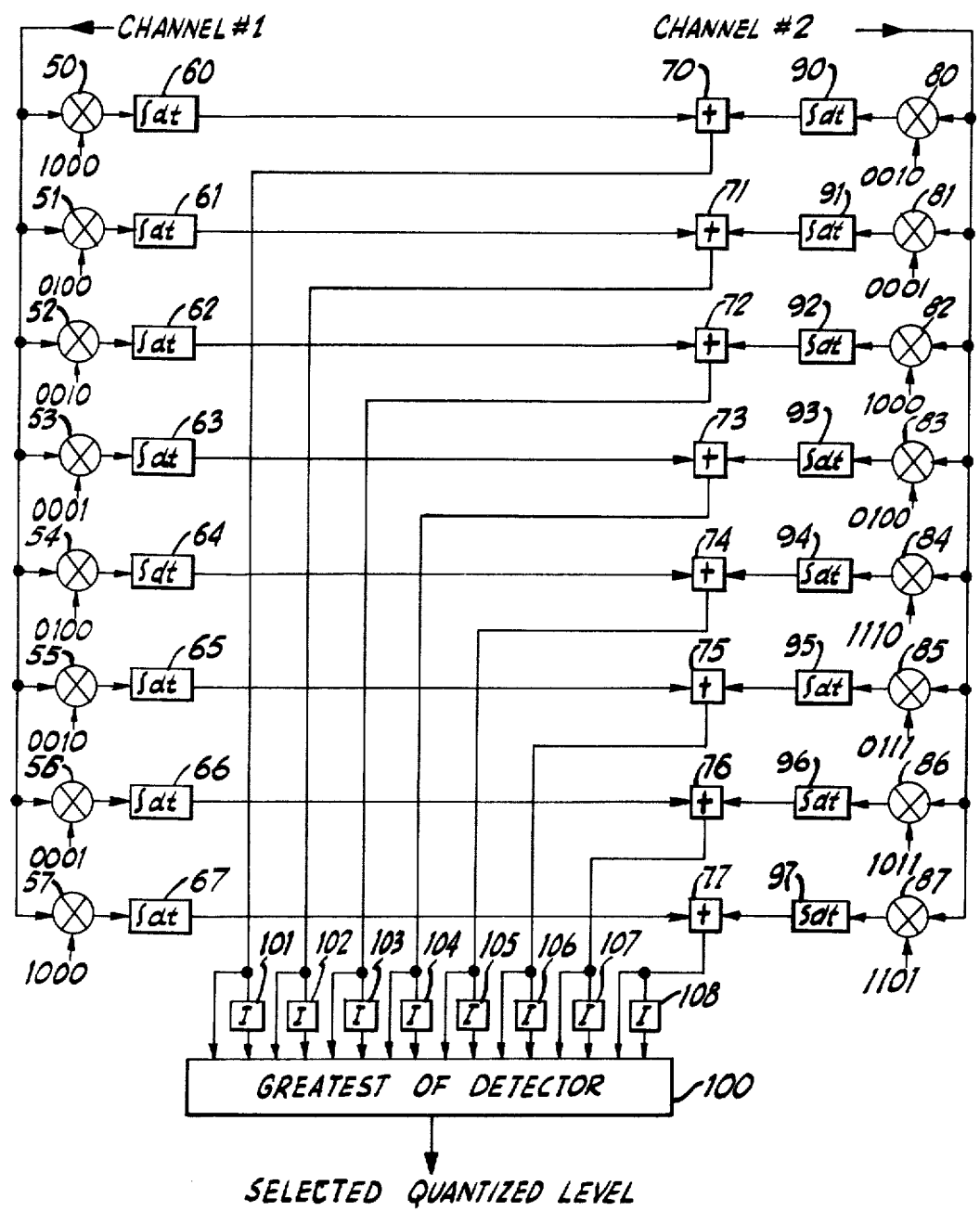
FIG. 3 is a functional block diagram of an active matched filter detection arrangement which can be employed in the receiving portion of the communications system of FIG. 2.

The configuration of FIG. 3 illustrates a first embodiment of the invention, which employs active matched filter detection. As was previously mentioned, this arrangement employs the time permutations of a code—which, simply stated, are the time shifts of the bits of the code, with the last bit replacing the vacated first bit. For a general 4 bit code, this is illustrated in the following manner:

$$a_1\ a_2\ a_3\ a_4$$
$$a_4\ a_1\ a_2\ a_3$$
$$a_3\ a_4\ a_1\ a_2$$
$$a_2\ a_3\ a_4\ a_1$$

As will be readily understood by those skilled in the art, one method of obtaining the time permutations of a binary code employs the feeding of the basic code bits into a shift register. The outputs of the separated shift register stages would then provide the time permutated codes. As will also be appreciated, sixteen possible choices exist for the 4 bit code previously assumed, with the code pairs possessing the unique property of having a cross-correlation value $\leq 0$ between any two pairs which result in total non-interference between any of the matched filter detectors in the receiver.

In FIG. 3, the Channel #1 input is applied to a phase detector or multiplier 50-57 the outputs of which are coupled by integrators (or low pass filters) 60-67 to an input terminal of a linear adder 70-77. The Channel #2 inputs are similarly applied by corresponding phase detectors or multipliers 80-87 and integrators (or low pass filters) 90-97 to a second input on the adders 70-77. A "greatest-of" detector 100 is employed, to receive the output signals from the adders 70-77 of both their polarities, and to this end, inverters 101-108 are indicated, the result being the application of a maximum of sixteen signals to the detector 100. Applied as multipliers to the stages 50-53 are the "a" codes of Channel #1 in the order as set forth above, while the "b" codes of Channel #1 are applied as multipliers to the stages 54-57, also in the order previously designated. In like manner, the "b" codes of Channel #2 are applied as multipliers to the stages 80-83 in the previous manner, while the "ā" codes of Channel #2 are applied as multipliers to the stages 84-87, again in the order as stated previously.

In operation of the arrangement of FIG. 3, the code pairs of Channel #1 and Channel #2 are de-multiplexed and orthogonally separated. For example, time multiplexing could be used, whereby the two codes comprising the separate channels could be easily separated from one another by appropriate gating. The Channel #1 codes are then coherently detected (matched filter detected) in a parallel bank of filters, as shown. Each detector involves multiplying the input with one of the Channel #1 codes, and then integrating (as by low pass filtering) the output of the multiplier. The Channel #2 codes are simultaneously coherently detected in a parallel bank of filters. The code mates of each bank of filters for Channels #1 and #2 are then linearly added and fed to the "greatest-of" detector along with their inverted signals. The inverted signals supply the detected outputs for the negative code pairs, such that all of the outputs (the inputs to the "greatest-of" detector) would be $\leq 0$, except the one corresponding to the particular received input signal. As will be shown below, that exception would have a signal level equal to $NV_i$, where $V_i$ equals the matched filter input signal voltage level, and N equals twice the number of bits in the binary code.

For the perfect noise code example where:
Code (a) = 1000
Code (b) = 0010
the following will be seen to be the individual detector outputs of Channel #1:

```
input =      0  1  0  0
           × 1  0  0  0
         Σ  -1 -1 +1 +1  = 0 = adder 70 input =      0  1  0  0
           × 0  1  0  0
         Σ  +1 +1 +1 +1  = +4 = adder 71 input =      0  1  0  0
           × 0  0  1  0
         Σ  +1 -1 -1 +1  = 0 = adder 72 input =      0  1  0  0
           × 0  0  0  1
         Σ  +1 -1 +1 -1  = 0 = adder 73 input =      0  1  0  0
           × 0  1  0  0
         Σ  +1 +1 +1 +1  = +4 = adder 74 input =      0  1  0  0
           × 0  0  1  0
         Σ  +1 -1 -1 +1  = 0 = adder 75 input =      0  1  0  0
           × 0  0  0  1
         Σ  +1 -1 +1 -1  = 0 = adder 76 input =      0  1  0  0
           × 1  0  0  0
         Σ  -1 -1 +1 +1  = 0 = adder 77
``` where: $0 \times 0 = +1$   $0 \times 1 = -1$
$1 \times 1 = +1$   $1 \times 0 = -1$ The individual detector outputs of Channel #2 would correspondingly be:

```
input =      1  1  1  0
           × 0  0  1  0
         Σ  -1 -1 +1 +1  = 0 = adder 70
```

-continued

```
input =      1  1  1  0
         x   0  0  0  1
    Σ       -1 -1 -1 -1   = -4 = adder 71 input =      1  1  1  0
         x   1  0  0  0
    Σ       +1 -1 -1 +1   = 0 = adder 72 input =      1  1  1  0
         x   0  1  0  0
    Σ       -1 +1 -1 +1   = 0 = adder 73 input =      1  1  1  0
         x   1  1  1  0
    Σ       +1 +1 +1 +1   = +4 = adder 74 input =      1  1  1  0
         x   0  1  1  1
    Σ       -1 +1 +1 -1   = 0 = adder 75 input =      1  1  1  0
         x   1  0  1  1
    Σ       +1 -1 +1 -1   = 0 = adder 76 input =      1  1  1  0
         x   1  1  0  1
    Σ       +1 +1 -1 -1   = 0 = adder 77
```

Summing the corresponding mate pair detector outputs in the respective adders then results in the fact that the adder 74 will provide an output equal to +8, with all the remaining adders providing outputs that are ≦0, including those that provide the signals for inversion. As will be understood, the detector 100 provides the selected quantized level of +8, indicating an increased amplitude of 8 times, where $V_i$ represents an input signal of unity amplitude.

As will be evident from the foregoing discussion, this active matched filter detection arrangement selects and provides the code pair at increased signal level, with no interference in adjacent positions. By using multiplexed perfect noise codes in this manner, attempts at jamming in a hostile environment, or self-interference, prove ineffective, as the detection function results in improving the signal-to-jamming ratio (S/J) or the signal-to-interference ratio (S/I) by a factor of n.

Figure 4:
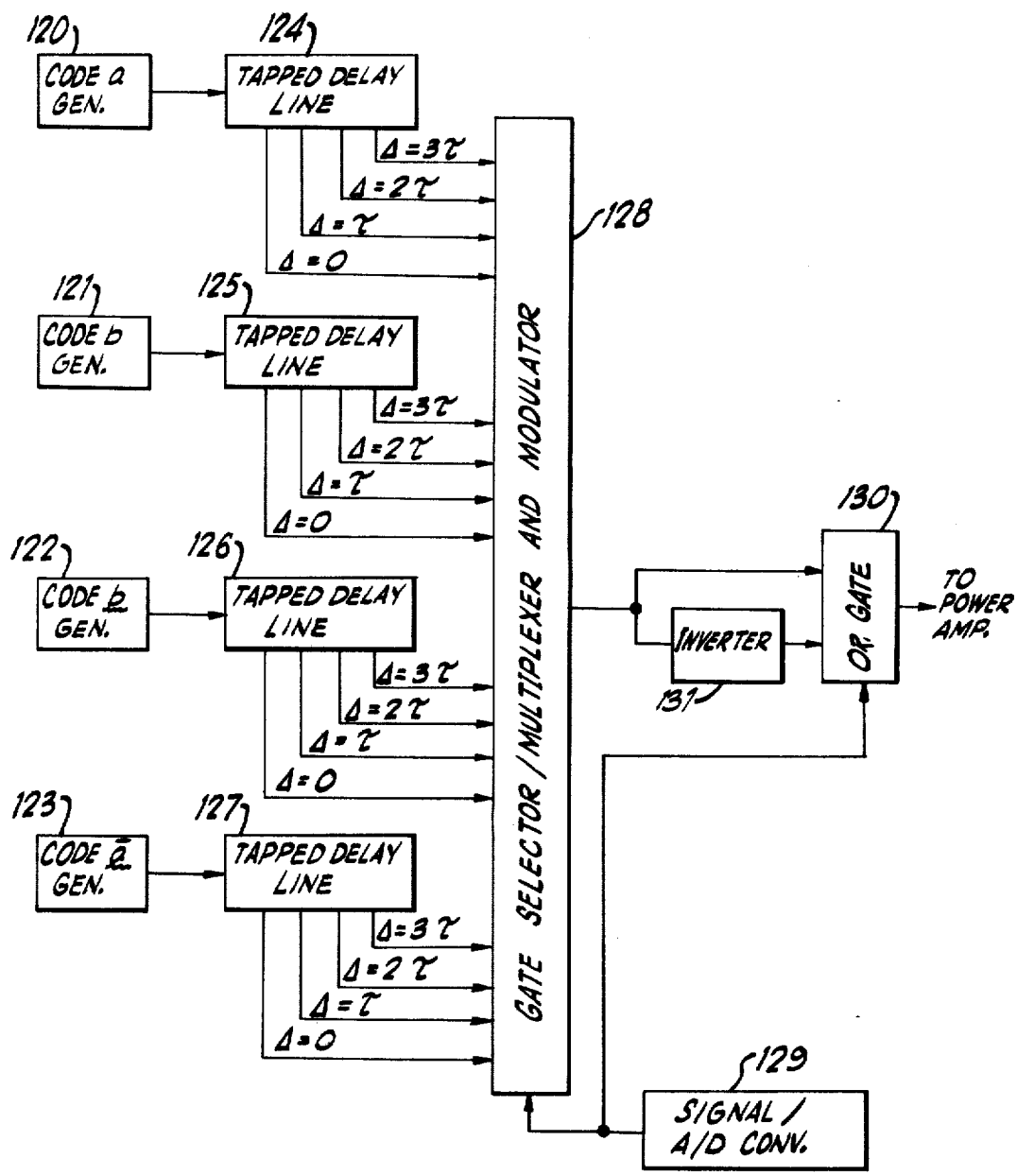
FIG. 4 is a functional block diagram of the transmitting portion of a communications system according to the invention, in which a passive, matched filter detector construction is used for the receiving portion of the system.

With the second embodiment of the invention, on the other hand, employing passive matched filter detection, the bi-orthogonal PCM coder of FIG. 4 simply delays the basic code pairs a, b and b̰, ā̰ in a tapped delay line, with appropriate outputs being selected for transmission. Four generators 120-123 are shown to provide the code "a", "b", "b̰" and "ā̰" signals, respectively, to one of four tapped delay lines 124-127, each of which is arranged to provide delays of 0, 1, 2 and 3 unit bit widths. The outputs of the delay lines are, as shown, occupied to a gate selector/multiplexer and modulator stage 128 to which is also provided the signal to be transmitted, after being first converted in an analog to digital converter stage 129, which also provides a gate signal in one of N/2 = 4 time slots that correspond to the appropriate quantized level, in a system employing a four bit code pair. This gate then selects, orthogonally multiplexes and modulates the appropriate code pair (a and b or b̰ and ā̰) containing the correct delay. The output is applied to an "OR" gate 130 with both polarities, employing an inverter 131, with the resulting output then being applied to the power amplifier of the transmitting portion, and from there to the antenna system, as indicated.

Figure 5:
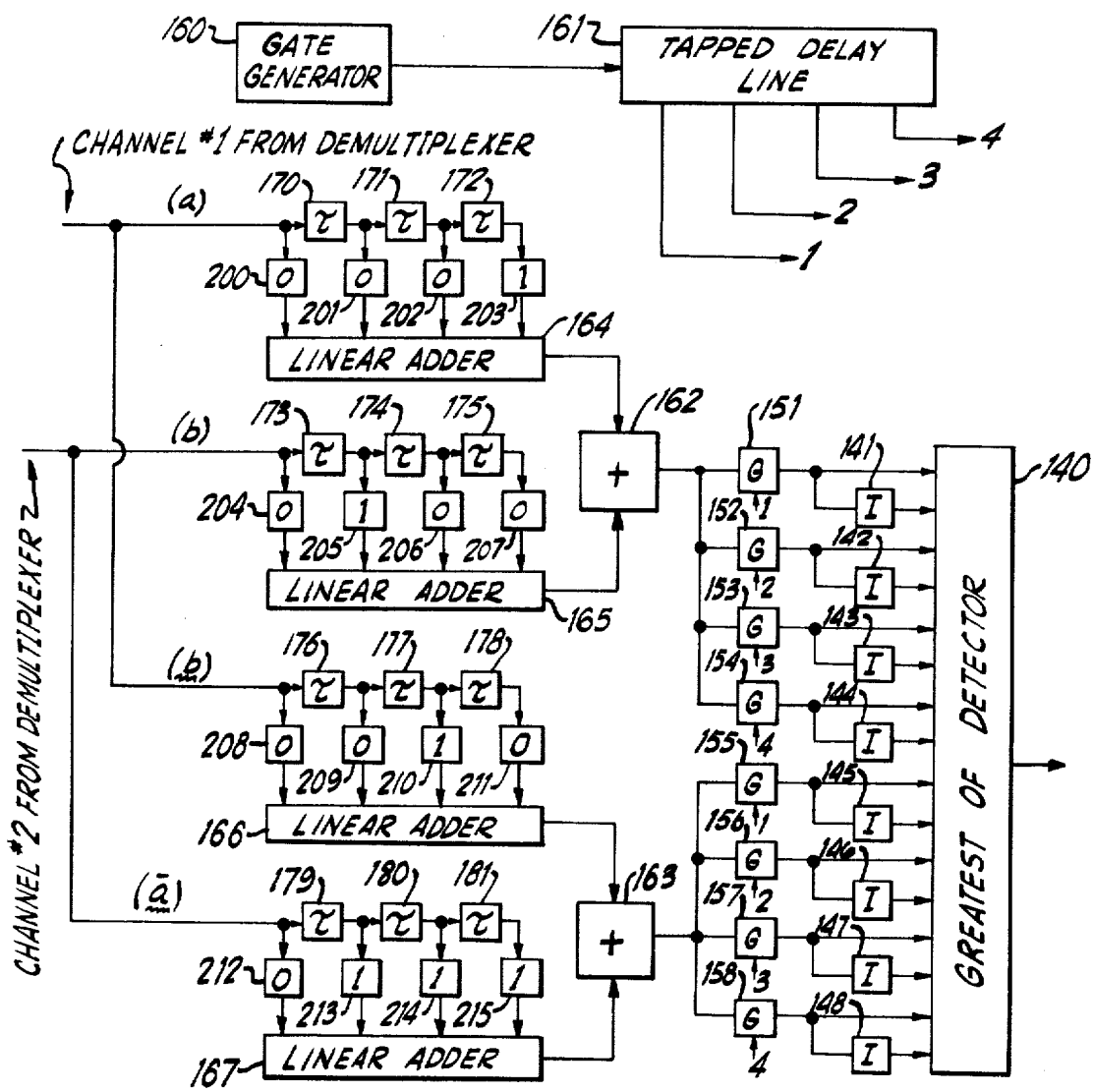
FIG. 5 is a functional block diagram of the receiving portion of the bi-orthogonal PCM communications system of which the arrangement of FIG. 4 represents the transmitting portion.

The bi-orthogonal PCM detector of FIG. 5 will be observed to be of simpler construction then that of the active system of FIG. 3 in that only a single matched filter pair is required for each of the two mate pair sets employed. A "greatest-of" detector 140 is again employed, along with eight inverter stages 141-148 to provide input signals of either polarity. Eight normally open gates 151-158 are included in the signal coupling path to the detector 140 with the control signals therefor being provided from a gate generator 160 coupled to a tapped delay line providing four timing signal outputs, denoted as 1, 2, 3, and 4. As shown, detected signals are provided the gates 151-154 from an adder 162, while detected signals are provided the gates 155-158 from an adder 163.

The input signals to the adder 162 will be seen to be supplied from a pair of additional adders 164, 165 included in a matched filter arrangement, while the inputs to the adder 163 are provided from two further linear adders 166, 167, also incorporated in a matched filter configuration. As will be seen, the input signals to the adders 164-167 are provided by means of a plurality of time delay circuits and by means of a plurality of phase control circuits. Specifically, the circuits 170-181 each delay the detected signal by one time slot of a synchronous timing cycle. The phase control circuits 200-215 are of construction to provide a signal feedthrough either with 0° or 180° phase shift, depending upon the specific code mate operated upon. In FIG. 5, the circuits identified by the reference numerals 200, 201, 202, 204, 206, 207, 208, 209, 211, 212 provide zero phase reversal for the code signal, whereas the circuits 203, 205, 210, 213, 214, 215 provide the 180° phase reversal required. In the description that is shown, it will be understood that the inclusion of a "0" within these phase control circuits represents a signal feedthrough with zero phase alteration while the inclusion of a "1" indicates a phase reversal of 180°. It will also be noted that the Channel #1 input is applied to the top portion of each of the two matched filter sections, while the Channel #2 input is applied to the lower portion of the two matched filters. The signal feedthrough conditions of the phase control circuits 200-203 will be seen to conform to the assumed code "a" input, while that for the phase control circuits 204-207 will be seen to conform to the assumed code "b" inputs. At the same time, the condition of the phase control circuits 208-211 will be seen to correspond to the assumed code "b̰" input while those of the phase control circuits 212-215 will be noted to correspond to the code "ā̰" input.

In the operation of the FIG. 5 detector, either of the codes a and b or b̰ and ā̰ are compressed to a lobeless single pulse in one of the time slots that correspond to one of the four gate signals that are obtained from the gate generator 160. This is then gated in the appropriate normally open gate 151-158, and its output level held long enough for the "greatest-of" detector 140 to establish its amplitude. The outputs of the remaining seven gates will be zero, including those that correspond to the second code set employed. The inverters 141-148 are employed to enable bi-orthogonal operation to be utilized, with negative compressed signals of 8 units being detected on the inverter outputs to provide 16 to 2N quantized levels.

To illustrate that the codes a and b and b̰ and ā̰ are mutually exclusive or totally non-interfering with each other, the following can be considered for the previously set forth bit code pairs:

$$\begin{array}{rl} a & = 1\,0\,0\,0 \\ b & = 0\,0\,1\,0 \\ \underset{\sim}{b} & = 0\,1\,0\,0 \\ \hline \overline{\underset{\sim}{a}} & = 1\,1\,1\,0 \end{array}$$

If the codes "a" and "b" are present on Channels #1 and #2, then the output from the filter pair that is matched to code "$\underset{\sim}{b}$" (adder 166) and code "$\overline{\underset{\sim}{a}}$" (adder 167) would be as follows:

Output "$\underset{\sim}{b}$" filter for Channel #1 input of 1000

$$\begin{array}{r} 1\,0\,0\,0 \\ 1\,0\,0\,0 \\ 0\,1\,1\,1 \\ 1\,0\,0\,0 \\ \hline 1 \cdot 0^3 \cdot 0 \cdot 0 \end{array}$$

Output "$\overline{\underset{\sim}{a}}$" filter for Channel #2 input of 0010

$$\begin{array}{r} 0\,0\,1\,0 \\ 1\,1\,0\,1 \\ 1\,1\,0\,1 \\ 1\,1\,0\,1 \\ \hline 0 \cdot 1^3 \cdot 1 \cdot 1 \end{array}$$

And the sum of these outputs from adder 163 is $$\begin{array}{r} 1 \cdot 0^3 \cdot 0 \cdot 0 \\ 0 \cdot 1^3 \cdot 1 \cdot 1 \\ \hline \cdots \cdots \end{array}$$

(In the foregoing, it will be appreciated that the exponent indicates the amplitude.)

If the codes "$\underset{\sim}{b}$" and "$\overline{\underset{\sim}{a}}$" are present on Channels #1 and #2, then the outputs from the filters matched to code "a" (adder 164) and code "b" (adder 165) would be as follows:

Output "a" filter for Channel #1 input of 0100

$$\begin{array}{r} 0\,1\,0\,0 \\ 0\,1\,0\,0 \\ 0\,1\,0\,0 \\ 1\,0\,1\,1 \\ \hline 0 \cdot 0 \cdot 0^3 \cdot 1 \end{array}$$

Output "b" filter for Channel #2 input of 1110

$$\begin{array}{r} 1\,1\,1\,0 \\ 0\,0\,0\,1 \\ 1\,1\,1\,0 \\ 1\,1\,1\,0 \\ \hline 1 \cdot 1 \cdot 1^3 \cdot 0 \end{array}$$

And the sum of these outputs from adder 162 is $$\begin{array}{r} 0 \cdot 0 \cdot 0^3 \cdot 1 \\ 1 \cdot 1 \cdot 1^3 \cdot 0 \\ \hline \cdots \cdots \end{array}$$

The passive filter pair that is matched to the input code pair would yield a single peak output that is increased in amplitude by a factor n.

If codes "a" and "b" are present in Channels #1 and #2, then the output from the filter pair that is matched to code "a" (adder 164) and code "b" (adder 165) would be as follows:

Output "a" filter for Channel #1 input of 1000

$$\begin{array}{r} 1\,0\,0\,0 \\ 1\,0\,0\,0 \\ 1\,0\,0\,0 \\ 0\,1\,1\,1 \\ \hline 1 \cdot 0\,0^4\,0 \cdot 1 \end{array}$$

Output "b" filter for Channel #2 input of 0010

$$\begin{array}{r} 0\,0\,1\,0 \\ 1\,1\,0\,1 \\ 0\,0\,1\,0 \\ 0\,0\,1\,0 \\ \hline 0 \cdot 1\,0^4\,1 \cdot 0 \end{array}$$

And the sum of these outputs from adder 162 is $$\begin{array}{r} 1 \cdot 0\,0^4\,0 \cdot 1 \\ 0 \cdot 1\,0^4\,1 \cdot 0 \\ \hline \cdots 0^8 \cdots \end{array}$$

The result is seen to be essentially the same as for the active detector system. The output (which would occur in the appropriate one of four time slots) has its amplitude increased by a factor of 8 or n over the input signal level. This reflects an improvement in the signal-to-jamming ratio (S/J) or the signal-to-interference ratio (S/I) by a factor of n since the noise voltage $\sqrt{N}$ would be uncorrelated and increase as a root-mean-square summation. Since the signal voltage is coherently summed it increases linearly by n, the output signal-to-noise voltage ratio would therefore be $n\sqrt{S}/\sqrt{n}\sqrt{N}$ where $\sqrt{N}$ corresponds to the interference or jamming noise voltage. The output signal-to-noise power ratio is simply the square of the input signal-to-noise voltage ratio or is nS/N.

While there have been described what are considered to be preferred embodiments of the present invention, it will be readily apparent that modifications may be made by those skilled in the art without departing from the scope of the teachings herein of using perfect noise codes in a bi-orthogonal PCM communications system. To carry out the teachings herein, all that would be necessary would be to select the perfect code mate pairs to be used and to arrange the phase detectors of FIG. 3 or the phase control circuits of FIG. 5 in appropriate relationship with respect to them. For at least such reason, therefore, resort should be had to the claims appended hereto for a true understanding of the scope of the invention.

I claim:

1. In a pulse code modulation communications system operative in conjunction with a timing reference signal, the combination therewith of:

first means for generating a first pair of coded pulse signals for transmission during a predetermined period;

second means for generating a time related second pair of coded pulse signals for transmission during said predetermined period;

delay means for delaying each of said coded pulse signals of each said pair to occur during respective different intervals of time during said predetermined period;

means coupling said pairs of coded pulse signals directly to respective said delay means;

inverter means for inverting said pairs of coded pulse signals and coupling the inverted signals to respective said delay means;

a source of message signals;

means for multiplexing said message signals with said first and second pairs of delayed coded pulse signals into two channels for transmission to users accessing said system at predetermined intervals of time; and means for receiving and detecting said coded pulse signals to produce an output signal having an impulse correlation function during an assigned predetermined interval of time within said predetermined period, said receiving and detecting means including demultiplexing means separating the transmitted signals into two channels, matched filter detector means for detecting predetermined pairs of coded pulse signals from each said channel, adder means connected to said filter detector means of each channel for combining said coded pulse signals from each of said pairs of signals from each of said channels, and amplitude detector means for detecting the maximum amplitude signal from said adder means of each channel and pairs of signals to provide said output signal.

2. The combination of claim 1 wherein each of said first-mentioned and second-mentioned means generates a sequence of coded pulses of having predetermined code patterns different one from another, but related thereto in that upon receipt and detection the autocorrelation function of each code will be of substantially equal magnitude and opposite polarity or zero for all intervals of time other than during said assigned, predetermined interval.

3. The combination of claim 2 wherein there is also included means for generating a pair of coded signals "a, b" coupled to said first-mentioned means for generating a first pair of coded signals for transmission "a, $\underaccent{\tilde}{b}$" and coupled to said second-mentioned means for generating a second pair of coded signals for transmission "b, $\underaccent{\tilde}{a}$", wherein the code signal "$\underaccent{\tilde}{b}$" is representative of the code signal "b" but with the order of any binary information included therein being reversed and wherein the code signal "$\underaccent{\tilde}{a}$" is representative of the code signal "a" but with the order of any binary information included therein being reversed and of opposite polarity.

4. The combination of claim 2 wherein each of said first-mentioned means and said second-mentioned means includes a plurality of code generators, one for each of said pairs of coded signals, and wherein said multiplexing means includes a multiplexer coupled to said code generators for synchronizingly mixing said pairs of coded signals with said timing reference signal, a transmitter coupled to said multiplexer and a receiver coupled to said transmitter.

5. The combination of claim 4 wherein said amplitude detector means is a "greatest-of" detection means responsive to the maximum amplitude of signal voltages applied to it corresponding to code signals "a, $\bar{a}$, $\underaccent{\tilde}{a}$ and $\bar{\underaccent{\tilde}{a}}$" and "b, $\bar{b}$, $\underaccent{\tilde}{b}$ and $\bar{\underaccent{\tilde}{b}}$", defined in accordance with the following:

$\bar{x}$ equals a code x but with the binary information of opposite polarity;

$\underaccent{\tilde}{x}$ equals a code x but with the binary information of reverse order; and $\bar{\underaccent{\tilde}{x}}$ equals a code x but with the binary information of opposite polarity and reverse order.

6. The combination of claim 5 wherein said match filter detection means includes means for time permutating said code signals by shifting individualized code bits such that the last bit of a code sequence replaces a vacated first bit.

7. The combination of claim 5 wherein said matched filter detection means includes means for time delaying said code signals by delaying for a single bit count each, the individualized bits of a given code sequence.

8. The combination of claim 1 wherein said matched filter detector means includes a plurality of multipliers connected in parallel to the signal inputs of each respective said channel and a plurality of integrators connected in series to each respective multiplier; a plurality of adders each connected to respective pairs of corresponding integrators from each of said channels, a plurality of inverters connected to respective said adders, and a maximum amplitude detector connected to each of said adders and said inverters.

9. The combination of claim 1 wherein said delay means includes a plurality of tapped delay lines connected to receive respective coded pulse signals.

* * * * *